United States Patent Office 3,162,321
Patented Dec. 22, 1964

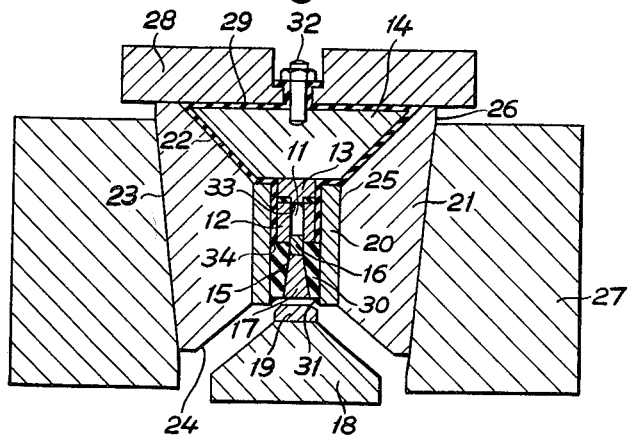

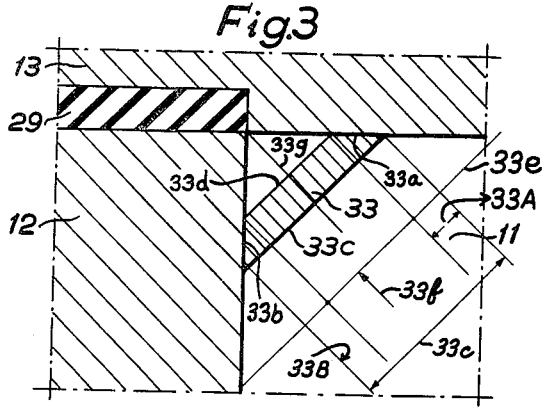
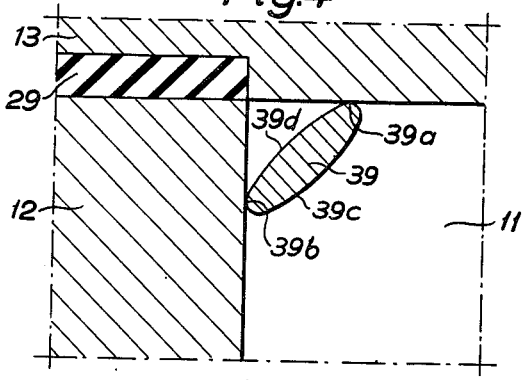
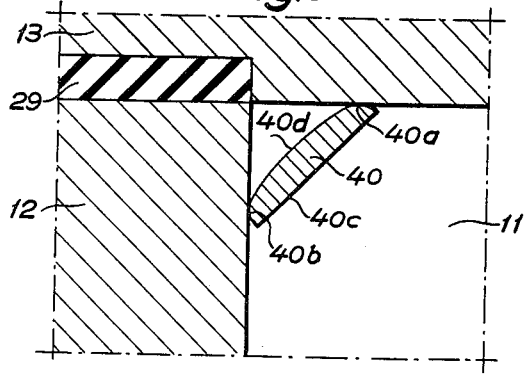

3,162,321
APPARATUS HAVING SEALING GASKET FOR
GENERATION OF HIGH PRESSURE
Fritz Wallin, Farsta, Sweden, assignor to Allmänna
Svenska Elektriska Aktiebolaget, Vasteras, Sweden, a
Swedish corporation
Filed Nov. 29, 1961, Ser. No. 155,579
Claims priority, application Sweden, Dec. 7, 1960,
11,821/60
6 Claims. (Cl. 220—46)

The present invention relates to an apparatus for generating high pressure, in which a space under pressure is limited by parts between which cracks or gaps occur, and the walls of which parts turned towards the space where the cracks or gaps are situated form an angle with each other.

With such pressure apparatus there are great problems in preventing material enclosed in the pressure chamber from leaking out or forcing its way out of the pressure chamber through the cracks or gaps. This is not only the case with gas and liquid material, but also with solids, particularly if the pressure in the space is great. At high pressure in the space, solid materials such as, for example, rubber or relatively soft metals, for example lead, could without difficulty flow out through any gaps which may occur.

The invention is based on the use of a specially shaped sealing gasket for sealing the pressure chamber against the cracks or gaps. It is built upon the principle that the sealing properties of a gasket will be particularly good if it is formed so that, when the gasket is in operation, the pressure at the sealing surfaces, i.e. the contact surfaces between the gasket and the walls of the parts where the cracks or gaps are situated, is greater than the pressure on the surface of the gasket which is turned towards the pressure chamber. This means that the gasket has an unsupported surface which is situated at the side of the gasket turned away from the pressure chamber. The said principle, based on the arrangement of the unsupported surface on a gasket, the so-called Bridgman's principle, has been previously utilized in high pressure vessels to effect a sealing between surfaces parallel with each other, the gasket being arranged between these surfaces. This is seen for example in Chemie-Ing. Techn. 28 (1956) No. 3, page 142.

The present invention does not relate, as the known one, to gaskets placed between and sealing against surfaces parallel to each other, but is concerned with the problem of effecting a gasket which seals against two surfaces which build an angle with each other. Thus the invention relates to an apparatus for generating high pressure in which a space under pressure is limited by parts between which a crack or gap occurs and the walls of which turned towards the space where the crack or gap is situated form an angle with each other. The invention is essentially characterised in that the space under pressure is sealed against the crack or gap by a gasket of rigid material having contact surfaces on the walls of the parts turned towards the space on both sides of the crack or gap and a surface turned towards the inside of the space, and that the projection of each contact surface of the gasket in a plane perpendicular to the direction of the resulting pressure force on the gasket which is derived from the pressure in the space is less than the projection in the same plane of half the surface turned towards the inside of the space.

The gasket may with advantage be of a rigid metal or metal alloy, for example of iron, iron alloys of different types such as steel, stainless steel, copper or brass. In certain cases also, inter alia, rigid plastics may be used as material for the gasket. It is of considerable importance for the function of the gasket that it is in itself rigid so that, when it is subjected to pressure from the pressure chamber, it substantially maintains its shape and is not notably deformed. The defined relation between the projection of each contact surface and the projection of half the surface turned towards the inside of the space will thus prevail when the intended pressure is maintained in the pressure chamber.

The apparatus for generating high pressure may comprise an autoclave or a pressure vessel in which material or materials enclosed in a pressure chamber, under the influence of the pressure, are subjected to alterations in physical properties or shape or undergo chemical reactions, or a hydraulic press cylinder for a hydraulic press or similar apparatus in which cracks or gaps occur between walls forming an angle with each other.

One object of the invention is thus to effect sealing of cracks or gaps in the said apparatus for generating high pressure, so that material enclosed in the apparatus and subjected to pressure cannot leak out through the cracks or gaps.

Another object of the invention is to effect a sealing gasket for an apparatus for generating high pressure in which gaps occur between walls which form angles with each other.

The invention will be more closely explained by describing some embodiments chosen by way of example, with reference to the accompanying drawing in which FIGURE 1 shows a cross section of an apparatus for generating high pressure according to the invention, having cylindrical pressure chamber, FIGURE 2 an enlarged view of the central part of the apparatus according to FIGURE 1, FIGURE 3 an enlarged view of a gasket used in the apparatus according to FIGURE 1 and situated at A in FIGURE 2, the cross section of which forms a trapezium, FIGURES 4 and 5 alternative embodiments of gaskets which may be used for the apparatus according to FIGURE 1.

Referring to FIGURES 1–3, 11 designates a cylindrical pressure chamber. The pressure chamber is limited by a tube 12, forming the envelope surface of the chamber 11, by a cylindrical plate 13 which lies tight against a rigid upper piston 14 having conical form, and by a stamp 15, the upper portion 16 of which has a cylindrical shape and the lower portion 17 of which has a conical shape. The pate 13 and the portion 16 form the end surfaces of the cylindrical pressure chamber. The diameter of the upper portion 16 is almost as large as the diameter of the pressure chamber. When the pressure apparatus is in use, the stamp 15 is displaced inwards into the pressure chamber 11 by the movable, substantially conical piston 18 which has an upper cylindrical part 19 which fits in the tube 20 which is arranged outside the tube 12 in order to give this support thereto. The tube 20 is surrounded by a pressure absorbing member 21, the limiting surfaces 22, 23 and 24 of which are conical and the limiting surfaces 25 and 26 cylindrical. Outermost is a strong mantle 27 having an internally conical shape. By pressing the mantle 27 upwards by means not shown, for example a hydraulic press, the member 21 receives an external supporting pressure. A supporting disc 28 is arranged above the rigid piston 14, which disc is itself supported by a fixed support, not shown. As is clear from FIGURE 1, the piston 14 except for a minor part thereof, is surrounded by an electrically insulating material 29. Around the stamp 15 in the area outside the pressure chamber is arranged a supporting body 30 which has the shape of a sleeve. The material in the supporting body 30 consists of rubber or similar material with great and continuous compressibility, for example natural rubber. The space in which the body 30 is positioned is substantially cylindrical. The envelope surface of the space is formed by the tube 20. The upper end surface of the space consists partly of the flat lower end surface of the tube 12. The pressure in the pressure chamber is generated by forcing the stamp 15 into the chamber 11, for example with a hydraulic press acting on the piston 18. At the same time as the stamp 15 is displaced upwards the supporting body 30 is subjected to a pressure by the piston 18 with its cylindrical part 19, with the result that the supporting body supports the stamp. A sealing ring 31 of toughened steel is arranged at the lower edges of the supporting body. Of course, the piston 14, just as the piston 18, can be made movable and provided with a punch which can be pushed into the pressure chamber, the pressure in the chamber being generated by forcing both the punches in. The object of the insulating layer 29 is to enable an electric current to be led into the chamber via the bolt 32. The current is led out through the piston 18 and further to the outside of the apparatus where suitable contacts may be arranged so that a closed circuit may be maintained.

In accordance with the invention, the pressure apparatus is provided with one or several sealing gaskets in the form or rings with openings therethrough, for example 33 and 34, of for instance toughened steel such as the steel C550 (Fagersta Bruk AB, Sweden) with a hardness of RC40, which according to the example in the FIGURES 1–3 have a cross section forming a trapezium. For each gasket, the projection of each of the surfaces constituting the contact portions with the walls and designated 33a, 33b, 34a and 34b on a plane 33e perpendicular to the direction of the resulting pressure force (indicated by arrow 33f) which is exercised on each gasket by the material in the pressure chamber 11 (which material may consist of, for example a mixture of gases, liquids or solid matter which is to be subjected to pressure and heat in order to effect a chemical alteration), and by the supporting body 30 in the lower pressure chamber, is less than the projection of half the surface turned towards the respective pressure chambers, i.e. 33c and 34c in each gasket in the same plane, these constituting limiting lines in a cross-section cut by a plane containing the axis of the opening in the ring. Surfaces 33c, 34c are symmetrical with respect to the bisectors (as 33g) of the angle between the walls. If the size of the projection in the said plane of surface 33a is designated 33A, of surface 33b, 33B, of surface 33c, 3C of surface 34a, 34A, of surface 34b, 34B and of surface 34c, 34C then the condition is fulfilled that 33A<½33C, 33B<½33C, 34A <½34C and 34B<½34C. Particularly good sealing is obtained if 33A and 33B are considerably smaller than ½33C, etc. The surface 33d and 34d are not supported. The pressure in the space 11, as in the space where the supporting body 30 is situated, may reach not only hundreds and thousands, but even tens of thousands of atmospheres which explains the necessity of a gasket to prevent elastic material, for example rubber of the type forming the supporting body 30, from flowing through cracks or gaps which may occur.

It is advantageous if the surfaces 33a, 33b, 34a and 34b are fitted to the respective surfaces of the parts in the pressure vessel against which they lie so that they seal against these even before the pressure is applied, since otherwise material in the respective pressure chambers would be able to pass the contact surfaces of the gaskets with the result that so much material would be collected outside the sides of the gaskets turned away from the pressure chambers, i.e. in the spaces 36, 37 and 38 that the surfaces 33d and 34d will be subjected to pressure. The gasket according to the invention does not need to have the shape of a trapezium, but may have another cross section, for example, one according to FIGURE 4 or one according to FIGURE 5. According to FIGURE 4, the gasket 39 has an oval, for example elliptical cross section and according to FIGURE 5 the packing 40 has a cross section which on one side has a curved and on the other side a straight limiting line.

As examples of materials which may be used for critical parts in high pressure vessels for which the type of material has not been touched upon, may be mentioned: for the tube 12, the stamp 15 and the cylindrical parts 13 and 19, cemented carbide, e.g. Carboloy 999 (General Electric Co.), for the tube 20 a tool steel having a hardness of RC 60, e.g. C550 (Fagersta Bruk AB, Sweden) or SAE/AISI A2, for the part 21, the mantle 27 and the pistons 14 and 18, a tool steel having a hardness of RC50–55, e.g. C550 (Fagersta Bruk AB, Sweden) or SAE/AISI A2, and for the electrically insulating layer 32 mica or paper.

In the exemplified cases the high pressure apparatus is cylindrical and thus the gaskets have substantially the shape of a circular ring. It is clear that if the pressure chamber has another shape, the gaskets must be fitted to it. If, for example, the pressure chamber has parallelepipedic shape, the gaskets will have substantially the shape of a rectangular frame or strip.

I claim:

1. A high pressure apparatus comprising parts having walls limiting a pressure space, between some of which parts a gap may occur, said walls forming substantially a right angle with each other where said gap is situated, a solid gasket of rigid material sealing pressure space from said gap, said gasket having the shape of a continuous frame with a central opening, said frame having sealing surfaces in contact with said walls on both sides of said gap, the cross section of said gasket in a plane containing the axis of said opening comprising contact portions on said walls and a limiting line facing the inside of the pressure space and substantially symmetrical with respect to the bisector of the angle between said walls, the projection of each contact portion of the gasket on a plane perpendicular to the direction of the pressure exerted on the gasket from within the pressure chamber being less than the projection on the same plane of half the limiting line facing the inside of the pressure diameter and one contact portion of the cross section of the gasket being situated nearer to said axis than the other one.

2. High pressure apparatus as claimed in claim 1 in which the cross section of said gasket has the shape of a trapezium, the longer of the parallel side of which is turned towards the inside of the pressure chamber and the legs of which lie against the walls of the parts limiting the pressure chamber.

3. High pressure apparatus as claimed in claim 1, in which said gasket is of a hard metal.

4. High pressure apparatus comprising a first part having an inwardly substantially cylindrical wall forming the envelope surface of a substantially cylindrical pressure chamber and a second part having a wall forming at least part of an end surface of said pressure chamber, the wall of said first part and the wall of said second part forming substantially a right angle with each other where they meet, a solid sealing gasket of rigid material positioned in the pressure chamber where the wall of said first part and the wall of said second part meet for sealing the pressure space against a gap which may occur between them, said sealing gasket having the shape of a substantially circular ring with a central opening, said ring having sealing surfaces in contact with the wall of said first part and with the wall of said second part on both sides of said gap, the cross section of said gasket in a plane containing the axis of said opening comprising a first contact portion on the wall of said first part and a second contact portion on the wall of said second part and a limiting line facing the inside of the pressure chamber and substantially symmetrical with respect to the bisector of the angle between the wall of said first part and the wall of said second part, the projection of each of said contact portions of the gasket on a plane perpendicular to the direction of the resulting pressure exerted on the gasket from within the pressure chamber being less than the projection on the same plane of half the limiting line facing the inside of the pressure chamber and said second contact portion of the cross section of the gasket being situated nearer to said axis than said first contact portion.

5. High pressure apparatus as claimed in claim 4 in which the cross section of said gasket has the shape of a trapezium, the longer parallel side of which is turned towards the inside of the pressure chamber and the legs of which lie against the walls of the parts limiting the pressure space.

6. High pressure apparatus as claimed in claim 4 in which said gasket is of a hard metal.

References Cited by the Examiner

UNITED STATES PATENTS

| | | | |
|---|---|---|---|
| 1,434,591 | 11/22 | Copp | 277—171 |
| 1,825,962 | 10/31 | Laird | 277—180 X |
| 1,965,273 | 7/34 | Wilson | 277—180 X |
| 2,781,943 | 2/57 | Carlstrom. | |
| 2,838,328 | 6/58 | Rohrberg | 277—226 X |
| 2,873,878 | 2/59 | Wolf et al. | 220—46 |

FOREIGN PATENTS 23,879   1907   Great Britain.

LEWIS J. LENNY, *Primary Examiner.*

WALTER A. SCHEEL, EDWARD V. BENHAM,
*Examiners.*